United States Patent

[11] 3,575,233

| [72] | Inventors | Joachim Mahle<br>Endersbacher Strasse 30, 7000 Stuttgart-Bad Cannstatt;<br>Walter Hartmann, Dorfgarten strasse 5, 7013 Oeffingen, Germany |
|---|---|---|
| [21] | Appl. No. | 765,501 |
| [22] | Filed | Oct. 7, 1968 |
| [45] | Patented | Apr. 20, 1971 |

[54] DIECASTING MOLD
5 Claims, 6 Drawing Figs.

[52] U.S. Cl. ..................................... 164/312,
18/30, 164/344, 249/68
[51] Int. Cl. ..................................... B22d 17/04
[50] Field of Search ........................... 164/113,
131, 137, 312, 339, 344, 347; 249/68; 18/(Space Removal Digest), (Flash Removal Digest), 39 (RM)

[56] References Cited
UNITED STATES PATENTS

| 2,477,368 | 7/1949 | Gits ............................. | 164/312X |
| 2,704,388 | 3/1955 | West et al. ..................... | 164/344 |
| 3,319,703 | 5/1967 | Heim ............................. | 164/344 |
| | | FOREIGN PATENTS | |
| 659,098 | 4/1938 | Germany ........................ | 18/30RM |
| 1,193,649 | 5/1965 | Germany ........................ | 164/347 |

OTHER REFERENCES
Dreykorn et al., German Printed Application No. P9975, Pub. 12-27-56.

Primary Examiner—Andrew R. Juhasz
Assistant Examiner—R. Spencer Annear
Attorneys—Francis D. Stephens and Hugo Huettig, Jr.

ABSTRACT: A separable diecasting mold is composed of a cover support plate to which the die core is attached, an ejector die having a die cavity, and a center plate between the cover support plate and the ejector die through which the core extends. Casting material is supplied under pressure through a groove in the joint between the cover support plate and center plate and leading to channels in the wall of the opening through the center plate, which channels terminate in the die cavity.

3,575,233

INVENTORS
JOACHIM MAHLE
WALTER HARTMANN

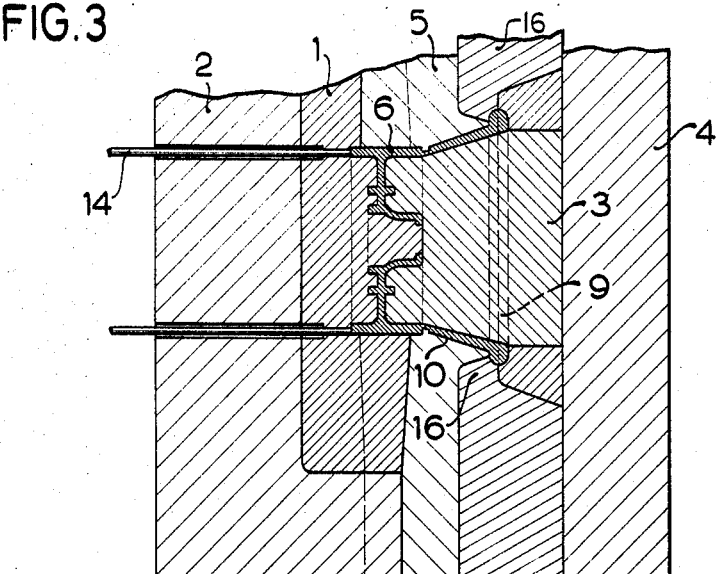
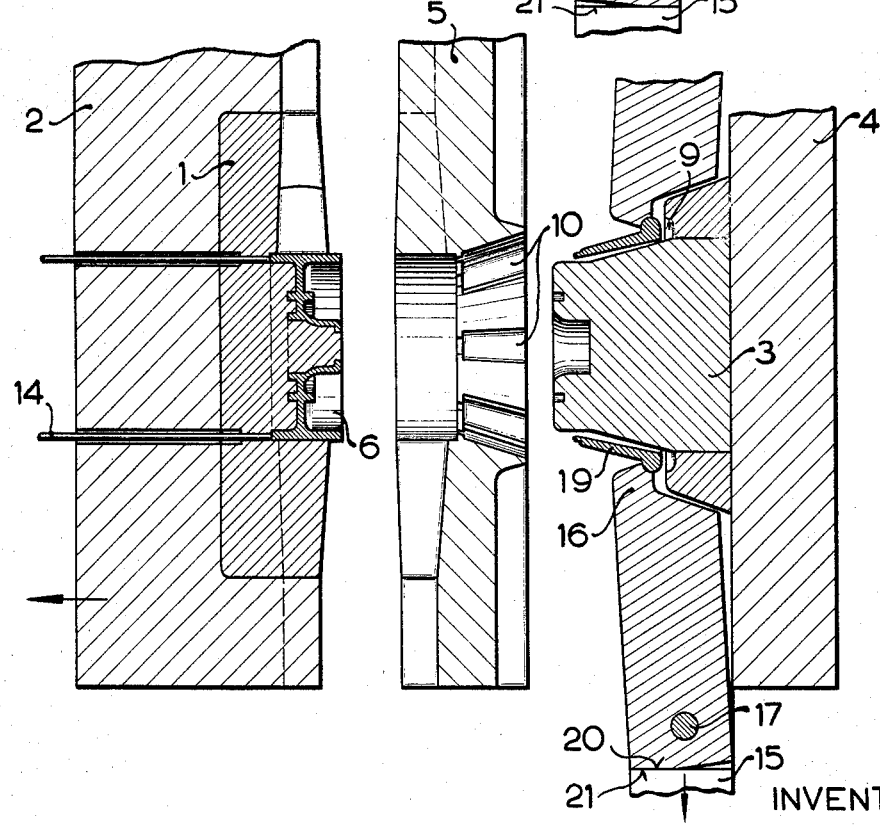

INVENTORS
JOACHIM MAHLE
WALTER HARTMANN

DIECASTING MOLD

This invention relates to a diecasting mold for use in a diecasting machine, which mold is composed of a cover support plate to which a die core is attached, a center plate through which the core extends, and an ejector die having a die cavity. A piston movable in the direction of the closing of the mold is used to supply casting material under pressure to the die cavity. The casting is ejected from the half of the mold containing the die cavity and the other half of the mold is composed of the center plate and the cover support plate.

A diecasting mold composed of two halves, one of which is the combined cover plate and core an the other is a one-piece plate, is disclosed in the U.S. Pat. to Brown, No. 2,969,569. This mold has an injection hole which leads from the piston cylinder to the mold cavity and which hole extends through the cover plate centrally of the die cavity.

In many cases, and especially when large intricate castings are being produced, such an injector hole is not adequate to ensure a satisfactory and uniform entry of the material flowing from the piston chamber into the mold cavity.

The object of this invention is to produce a diecasting mold which is separable and in which casting material supply channels are appropriately arranged which can convey, without difficulty, a large amount of casting material for the filling of large and intricate mold cavities, and in which mold the automatic separation of the waste material, or cast-on, from the mold can be easily removed, while at the same time the residue of the casting material from the piston cylinder is also removed as the mold is opened.

In general, these objects are obtained in that the core is attached to the cover support plate and forms a part of one-half of the mold, which core extends through a center plate and into the mold cavity in the other half of the mold. When the mold is opened, the center plate and ejector die containing the mold cavity are moved in the same direction. Casting material supply grooves are provided in the joint between the core support plate and center plate together with supply channels in the wall of the opening through the center plate. The center plate is movable in the same direction as the ejector die when the die is opened and casting material supply grooves are provided in the joint between the cover support plate and the center plate.

The means by which the objects of the invention are obtained are described more fully with reference to the accompanying drawings in which:

FIG. 3 is a cross-sectional view taken on the line III–III of FIG. 2;

FIG. 4 is a view similar to FIG. 3 but with the mold open;

Figure 1:
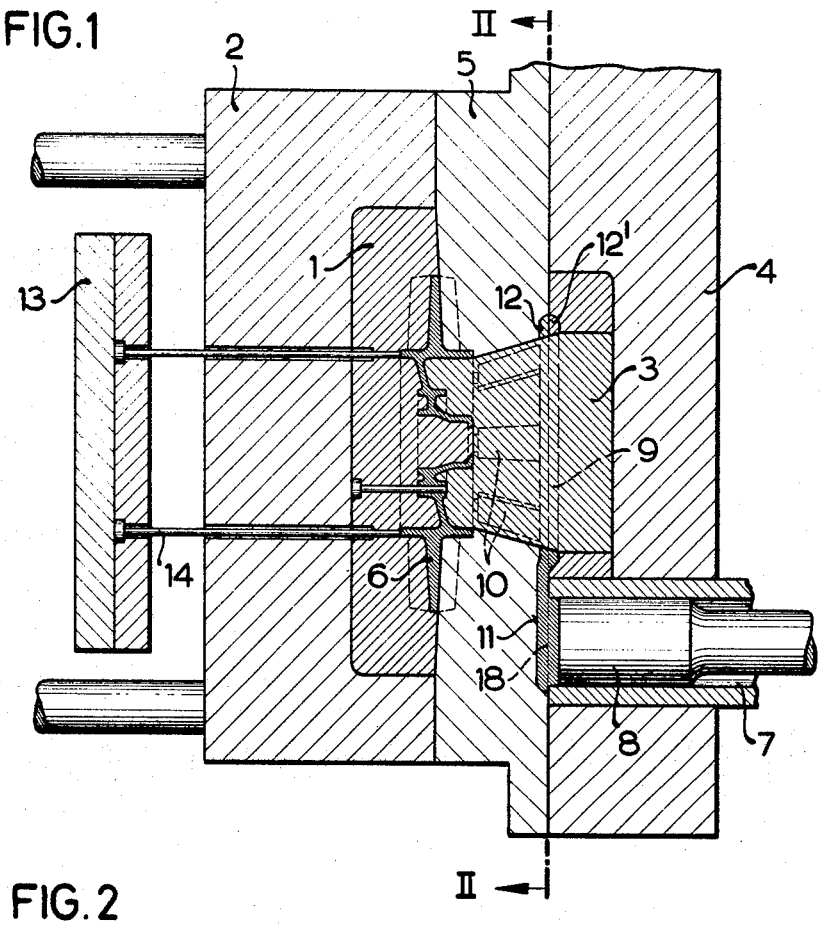
FIG. 1 is a cross-sectional view showing the mold in closed position and filled with casting material.
Figure 2:
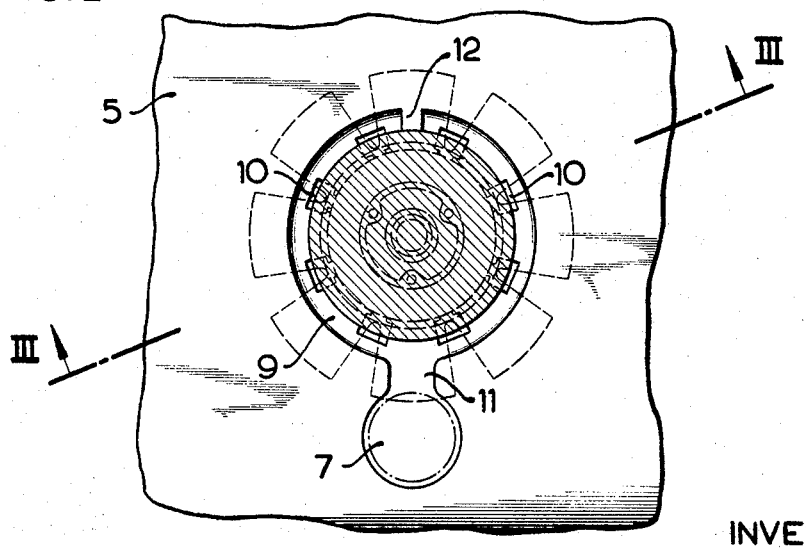
FIG. 2 is a cross-sectional view taken on the line II–II in FIG. 1.

As shown in FIGS. 1 and 2, one-half of the mold is composed of a die plate 1 having a die cavity supported in a die support plate 2.

The other half of the die is composed of a core 3 attached to the cover support plate 4 mounted in the die press, not shown, and a center plate 5 which is movable in the direction of the opening of the mold by a conventional means.

In FIGS. 1 and 3, the mold is shown filled with the casting material such as a casting 6 for a fan. The die cavity is bounded by the ejector die 1, the core 3 and the opening through the center plate 5. The cylinder 7 containing a piston 8 extends through the supporting plate 4 so that the piston is movable parallel to the closing direction of the mold. Cylinder 7 communicates with the mold cavity through an annular channel 9 and eight supply channels 10 in the wall of the opening through center plate 5 which branch off from channel 9 and extend between the core and the center plate 5. Annular channel 9 can be shaped as a circle or a polygon, but it is preferred that channel 9 be closed off at a point preferably opposite the groove 11 leading to the cylinder 7 so that the casting material solidifying and becoming rigid in channel 9 cannot shrink into core 3. The channel 9 is interrupted by a wall 12 and 12' welded in the channel. The mold is completed by the conventional ejector pin holding plate 13 on which are mounted the ejector pins 14.

In addition to the center plate 5 of FIG. 1, a pair of slides 15 having front ends 16 are included in FIGS. 3 and 4, and which, when in closing position, as shown, partly engage the cooled and solidified material in annular channel 9. The ends 16 are turnable around shaft 17 by an amount which approximately corresponds to the thickness of the residual casting material 18, FIG. 1, remaining in the cylinder after the mold cavity has been filled. This permits the automatic removal of the residue 18 from the cylinder before the excess casting material is stripped from the casting 6. The casting material 19, FIG. 4, solidified in the channels 9 and 10 is termed the cast-on. The swinging movement of ends 16 on slides 15 is limited by stop surfaces 20 and 21.

It is clear that it is possible to satisfy the objects of this invention with any desired number of casting material supply channels for obtaining a uniform filling of the mold chamber, said channels being separate and regularly arranged and to a great extent independent of the position of the cylinder 7.

The mold can be controlled, FIG. 4, so that, when the mold is opened, the support plate 2 with the ejector die 1 is first moved and separated from the center plate 5 which is then moved in the direction of the plate 2. This movement pulls the cast-on 19 only so far as permitted by the swinging movement of the ends 16 on the slides. The cast-on in this manner is stripped from the core 3 and at the same time the casting material residue 18 is pulled out of the cylinder 7.

As soon as the stops 20 and 21 prevent a further swinging of ends 16, the cast-on 19 is held back and stripped from the casting 6, which moves further in the ejector die 1.

When the center plate 5 has reached a position on it, it is easily accessible and then stops while the die 1 moves along with the support plate 2 until the space between die 1 and plate 5 is large enough to make possible the ejection of the casting by means of the pins 14 in a conventional manner. At this time, or even before, the slides 15 are pulled in the direction of the arrow, FIG. 4, so that the ends 16 lose their engagement with the cast-on 19 so that the latter can be removed and/or falls out on its own when the taper of the core 3 is large enough.

The advantages of this invention can be retained when, instead of using several casting material supply channels, only a single supply channel is used and such channel being expanded in width over a larger part of the circumference of the core so that just as much casting material can be supplied to the die cavity as is possible with the use of a plurality of separate channels. In some cases, the use of a single supply channel so constructed is more advantageous as especially in the case where the channel can end at a point in the mold cavity which has such a large cross section that it acts as a distributing channel which enhances a uniform distribution of the casting material flowing into the die cavity.

Figure 5:
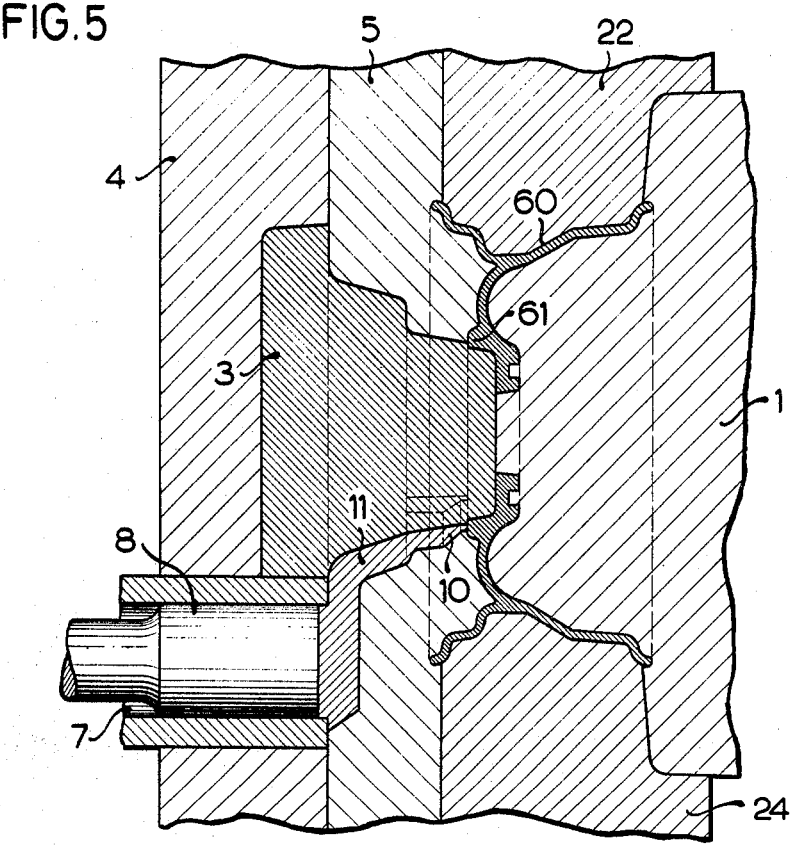
FIG. 5 is a view similar to FIG. 1 of a modified form of the invention.
Figure 6:
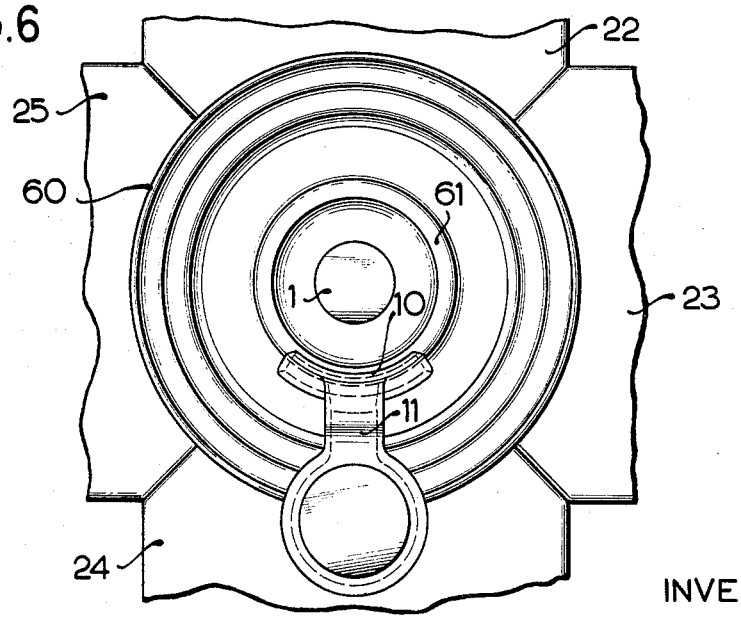
FIG. 6 is a plan view of the die cavity filled with a casting according to FIG. 5.

In the modification of FIGS. 5 and 6, such a mold having a single supply channel is shown. One-half of the mold is composed of the die cavity and the ejector and the other half the core and cover plate. The first half includes the movable support plate, not shown, and four radially movable die segments 22, 23, 24 and 25. The cover support plate 4 holds the core 3 which is shown having a circular cross section. The center plate 5 is movable in the direction of the opening of the mold and is included with one-half of the mold. The die cavity is shown filled with the casting material and/or the finished casting 60 and is bounded by the front sides of the mold elements 1, 3, 5, 22, 23, 24 and 25. The die cavity communicates with the cylinder 7 which extends through the plate 4 and which contains a piston 8 which moves parallel to the mold-closing direction, with this communication being made by groove 11 and channel 10 having the shape of a circular segment. Channel 10 expands in width across a larger portion of the circumference of the core which results in the cast-on having a cross section approximately just as large as the sum of the cross sections of the channels of FIGS. 1 and 2. Channel 10 bisects the die cavity at a point in which the casting has a relatively thick-walled annular bulge 61 through which the entering liquid casting material can be easily distributed.

Having now described the means by which the objects of this invention are obtained.

We claim:

1. A separable diecasting mold enclosing a die cavity and comprising a movable ejector die plate (1), a cover die composed of a fixed support plate (4) and a core (3) attached to it, and a center plate (5) between said cover die and said ejector die through which said core extends, said center plate (5) being separable from said cover die in the same direction said ejector die moves when said mold is opened, a metal injection apparatus including a short cylinder (7) movable parallel to the opening and closing direction movement of said injector die, and channel means between said cylinder and said die cavity for conveying liquid casting material from said cylinder into the die cavity, said channel means including at least one supply channel (10) in the wall of the opening through the center plate and extending between the surfaces of said core (3) and said center plate (5) in the axial direction of said mold.

2. A mold as in claim 1, said channel means comprising several supply channels (10), extending between the contacting surfaces of said core (3) and said center plate (5) in the axial direction of said mold, an annular channel (9) around said core communicating with said supply channels (10), and a groove (11) extending between said annular channel and said cylinder (7).

3. A mold as in claim 2, wherein said annular channel (9) is interrupted opposite said groove (11) by a wall (12, 12′).

4. A mold as in claim 3, said center plate further comprising slide member means (15, 16) movable transversely to the closing direction of the mold for engaging the solidified casting material in the core channels (10) and annular channel (9) and stripping the casting material away when the mold is opened.

5. A mold as in claim 4, further comprising ends (16) on said slide member means swingable in the opening direction of the mold, and stops (20, 21) for limiting the swinging of said ends.